Patented May 10, 1932

1,857,402

UNITED STATES PATENT OFFICE

PAUL O. ROCKWELL, OF BALTIMORE, MARYLAND

CAUSTIC SILICATE

No Drawing.   Application filed April 5, 1930. Serial No. 442,030.

(GRANTED UNDER THE ACT OF MARCH 3, 1883, AS AMENDED APRIL 30, 1928; 370 O. G. 757)

This invention described herein may be manufactured and used by or for the Government for governmental purposes, without the payment to me of any royalty thereon.

This invention relates in general to absorbents and more particularly has reference to absorbents of a granular nature which have very high absorbing capacities for moisture and acid vapors and to a method of preparing these absorbents.

Absorbents are used extensively in gas masks and other apparatus for separating vapors or gases from the air passing through the canister. In the case of gas masks, various materials have been used in order to purify the gas drawn through the canister to render the same suitable for breathing purposes. Absorbents are used which will neutralize acid fumes or otherwise change the toxic characteristics thereof. Activated charcoal, caustic pumice, moist soda lime and similar absorbents have been widely used. These absorbents are usually granular and are of a size from 6 to 30 mesh. In addition to absorbents of the above type, other granular absorbents are used which will separate water vapor from an atmosphere when the atmosphere is passed through the canister by absorbing the water vapor from the atmosphere. Absorbents of the latter type include silica gel, kaolin, calcium chloride, caustic pumice and others.

Most materials which absorb water vapor become soft and lose their original form so that after considerable water has been absorbed, the material cakes together. Phosphorus pentoxide forms a syrup. Calcium chloride becomes moist and forms a solid cake, as does sodium hydroxide. Absorbents such as silica gel and charcoal are unchanged in regard to physical properties after absorbing water vapor, but the amount absorbed per cc. of absorbent, is very much less than by calcium chloride. The change in physical properties after the absorption of water vapor, is of importance, and should be considered. It will be appreciated that an absorbent which will absorb both water vapor and acid vapors will be desirable.

Absorbents of this type include charcoal, silica gel, lump or flake caustic soda etc. Charcoal and silica gel have a low capacity, and caustic soda loses its form and cakes easily. It will be important, however, that the combined absorbent have the properties which would prevent the absorbent from readily deteriorating so that the same could be used over relatively long periods of time. Another property to be considered in the case of all absorbents is that of resistance to gas flow. It of course is obvious that absorbents having the least resistance to gas flow after use are the most desirable.

As yet, however, no absorbents have been developed which satisfactorily and practically serve the purpose of absorbing both acid vapors and water vapor.

A major object of this invention is to provide absorbents which are free of the disadvantages inherent in the prior art.

Another object of this invention is to provide processes of producing absorbents which are free from the disadvantages of the absorbents heretofore used.

Yet another object of this invention is to provide processes for the preparation of a granular gas purifying composition which is efficient and may be effectively employed.

A further object of this invention is to provide processes for the production of granular gas purifying compositions similar to caustic kaolin, employing a wide variety of raw materials in a manner which is highly efficient and may be easily carried out.

Still another object of this invention is to provide an absorbent which will serve both as an absorbent of water vapor and as an absorbent of acid vapor.

A still further object of this invention is to provide processes for the production of granular material of high alkalinity, possessing special physical properties as to hardness, resistance to gas flow, high absorption coefficients which make it highly valuable for use in the purification of gases.

With these and other objects in view which may be incident to the present invention, the inventive concept consists in preparing caustic gas absorbents by causticizing silica and other substances.

In accordance with the present invention, a combination is made of an absorbent and a compound which when combined will absorb both acid and water vapor. The resulting compound may be prepared by treating silica, kaolin, pumice, caustic silicates, caustic aluminates and other similar substances or materials which after treatment result in products having the desired properties.

When a combination is made of an absorbent which will absorb both acid vapor and water vapor effectively, such compound is advantageous in that the amount of absorbent material required may be decreased without detrimentally affecting the total absorption effect. This may be accomplished by such a material as caustic pumice and other materials having similar and desirable properties. Because of its high alkalinity, this material is capable of absorbing considerable amounts of acid and water vapor and may be advantageously used for this purpose in gas masks for removing acid and water vapor from air and in other instances where separation of gases is desirable.

Absorbents of a granular nature capable of absorbing both acid vapor and water vapor may be prepared in accordance with the concept of the present invention. For purposes of explanation, these absorbents may be classified into two groups. One group may be considered as consisting of mixtures of caustic alkalies with caustic silicates and/or caustic aluminates, and the other group may be considered as combinations of granular material, such as pumice and other suitable compounds with caustic alkalies.

Compositions pertaining to the first group may be made by adding the silicate, aluminate or other substance to fused caustic soda, stirring until homogeneous, cooling and breaking up into granular form. A second heating may be given, if desired, to obtain the highest absorptive activity for water vapor. Compositions pertaining to the second group may be made from granular materials under such conditions as will cause the combination of caustic soda and a material such as pumice, for example, to take place without loss of granular form of the original material. Drying and baking of the product in the case of the compounds pertaining to the second group may be carried out correspondingly, to the procedure involved in preparing compounds relating to the first group.

Other alkalies such as sodium carbonate and sodium phosphate may be combined with the alkali silicate or alkali aluminate. Other salts which are soluble in fusing alkalies, may also be used to form compositions or compounds with the alkalies. It may be possible that the presence of the alkaline earth salts may be advantageous in increasing the hardness of the finished product.

Compositions of the type above set forth may be easily prepared by several methods. A composition comprising largely sodium hydroxide or other alkali metal hydroxides with alkali metal salts of acids such as silicic acid may be made by adding alkali metal silicates to a fused caustic, stirring and then granulating by any suitable or desirable method.

One method is to chill the reaction product so as to form slabs and subsequently reduce the slabs to the desired size in any manner. If found desirable, a final heating of the product at a dull red heat may be carried out. Inert material such as charcoal may be added to the product to decrease the tendency to cake on the absorption of water vapor. While in the foregoing procedure, reference has been specifically made to alkali metal silicates, I wish it to be clearly understood that alkali metal aluminates and other alkali metal salts may be employed with advantageous results.

In accordance with the above procedure, any of the alkali metal hydroxides may be mixed in such proportions when forming the new compounds that the product will have a silica or alumina content of 15% or higher. Very desirable results may be obtained when the product has a silica or alumina content approximating 40%.

I have found that when a sodium silicate-sodium hydroxide composition is used to absorb water vapor, the amount of water vapor absorbed was .15 grams per cubic centimeter of 8 to 14 mesh granules when air approximately saturated with moisture at 25° C. was passed through a 10 centimeter layer of the absorbent at a rate of 500 centimeters per minute for 120 minutes. After subjecting the material to treatment for this period of time, the capability of the absorbent for absorption of moisture had not been reached. The foregoing values are illustrative of the high rate of absorption and the high absorptive capacity of the material.

In accordance with the present invention, compositions which will absorb both acid vapor and water vapor may be made by treating or soaking granular material containing silica or alumina in caustic alkalies under such condition as will cause a combination to take place without loss of the granular form of the original material. The advantage of this method will be appreciated when consideration is given to the fact that the raw material may be ground to approximately the size desired in the finished product before it is subjected to treatment. In carrying out the process to be hereinafter described, materials containing alumina or silica such as kaolin, silica, rotten stone, fire clay, etc., may be used.

In carrying out the process, an alkali of a technical grade such as caustic soda or potash may be dissolved in water. The solution may also contain considerable amounts of silicates, aluminates, borates and phosphates. Conditions of treatment of the material may be varied. For instance, the strength of the solution, the time of the reaction in the solution, and the temperature of the solution may be varied depending somewhat on the nature of the raw materials. These conditions may be chosen for given raw materials so as to fulfill two requirements. One of these requirements is to effect a moderate rate of reaction between the granular material and the solution, and the other is to bring about a combination of the alkali and the raw material without loss of the granular form of the raw material. The conditions above set forth are inter-related, and variations in the conditions may be employed to obtain a satisfactory product. As a rule, however, highly concentrated solutions of alkali are advantageous, and the time of reaction and the temperature of the solution may be varied to control the rate of reaction.

The concentration of the alkaline solution employed in carrying out this process may be widely varied. For instance, the concentration of the solution may vary between two parts of alkali to one of water, and five parts of alkali to one of water. Concentrated solutions are preferable in many instances.

When granular kaolin is treated, the temperature may be varied from 100° C. to 230° C., and the time of reaction may be varied from five minutes to several hours. Caustic kaolin of very good quality may be made by adding the granular kaolin to a solution containing between 75% and 80% of alkali which is at a temperature of about 100° C. Of course, agitation of the solution may be maintained while the constituents are being mixed and while the reaction is taking place. It will be found that the temperature will increase to around 140° C. and under these conditions, the combination of kaolin and caustic may be carried to a satisfactory stage in 10 to 20 minutes. After the reaction has been carried to the desired degree of completion, the solution and the caustic kaolin may be separated in any manner. If found economical or desirable, the solution may be used to causticize additional kaolin. It will be found that the solution separated from the treated caustic kaolin contains alkali hydroxides, silicates, aluminates and carbonates.

In order to finish the product, the causticized kaolin may be placed in a dryer of any desired type, in which the formation of hard granules may be effected. If desired, the granules may be dried by baking, while the same are continually agitated. It will be found desirable to strongly heat the material in order to obtain a fairly rapid and thorough baking. It has been found that a product of good quality can be obtained when the baking is carried out above 300° C. After completing the process, the finished product may be screened to size, and packed in suitable containers, so that the same may be ready for use when needed.

The above process may, of course, be varied within reasonable limits. For instance, it has been found that a caustic kaolin for absorbing moisture and acid vapors may be prepared by introducing granular kaolin into a solution containing from 40% to 90% caustic alkali at a temperature ranging between 80° to 140° C. In this instance, the temperature is maintained between 100° and 180° C. for a period of time varying from 10 to 30 minutes. After this treatment, the material may be separated from the solution and treated in order to obtain a finished product, as hereinbefore set forth.

When an absorbent is made from pumice as a raw material, it is desirable to carry out the reaction at approximately 140° C., although a temperature range about 80° to 160° C. may be used with fairly satisfactory results. In this instance, a solution containing between three and four parts of alkali to one part of water is heated to 120° C., and the pumice is stirred into the solution rather rapidly. Heat may be applied if necessary, in order to bring the temperature of the solution up to 135° or 140° C.

It has been found that the rate of reaction increases rapidly above 140° C., consequently, the temperature should be kept below 140° C. in order that ease of control may be maintained. The solution and the caustic are agitated and heated for about 20 minutes, although this time may be varied within a range of 10 minutes with fairly satisfactory results. After the pumice has been treated with the alkali, the solution and the treated material are separated. As in procedures hereinbefore set forth, the product may be baked or otherwise treated in order to place it in a suitable condition for use.

Good results have been obtained when the above reaction is carried out employing a solution containing from 40% to 90% alkali, and somewhat better results are obtained when the range of the alkali concentration is between 70% and 85%.

In any of the above procedures, the solution of alkali separated from the caustic product may be used for treating additional material.

In the foregoing description, specific mention has been made of certain materials, but I wish it to be clearly understood that the raw material may be varied and the conditions of treatment may also be varied within rather wide limits. The optimum conditions of combination of caustic and the raw material will, of course, depend on the nature of the raw material. Very porous materials will probably require weaker caustic solutions and more dense materials. The properties of the finished product will depend to a certain extent on the particular conditions under which the product is made, and these conditions consequently may be varied to obtain products having varying degrees of utility.

Because of the importance of resistance to air flow, some comparative experiments have been carried out on several absorbents. The method employed consists in passing air approximately saturated with water at a temperature between 22° and 25° C. through the absorbent in a tube. The rate of flow through the bed of absorbent was regulated to 500 centimeters per minute. Materials compared were caustic pumice of 8 to 14 mesh prepared in accordance with the present invention, caustic pumice prepared in accordance with methods of the prior art, and caustic kaolin prepared in accordance with the present invention. The caustic kaolin used in this experiment was made by allowing the kaolin to react with the caustic for 15 minutes at 140° C.

As a result of this experiment, the caustic pumice made in accordance with the prior art became pasty after absorbing moisture for one hour. The rate of increase in the resistance to flow after two and one-half hours was quite large. At the end of three hours, the pumice had two and one-half times the resistance of the caustic pumice and the caustic kaolin prepared in accordance with the present invention. It will be appreciated, therefore, that the caustic materials prepared in accordance with the present invention may be used over longer periods of time without the resistance to gas flow encountered in employing the materials prepared in accordance with the prior art.

After absorbing moisture for a period twice as long as the caustic pumice prepared in accordance with the prior art, the material prepared as set forth herein had only approximately one-half the resistance as that offered by the prior art material. It was noted in carrying out the comparative tests that the caustic pumice tended to get pasty and form a solid mass after six hours, whereas such a condition was not observed after fourteen hours of use of caustic kaolin.

The data given in the following table illustrates the results obtained.

*Resistance in mm. water*

| Time (hours) of passage of air and water vapor | Our caustic pumice, 8-14 mesh | Caustic kaolin, 8-14 mesh | Caustic pumice according to prior art, 8-14 mesh |
|---|---|---|---|
| 0 | 6 | 6 | 7 |
| 1 | 7 | 7 | 8 |
| 2 | 8 | 8 | 12 |
| 3 | 10 | 9 | 25 |
| 4 | 12 | 11 | 55 |
| 4.5 | | | 85 |
| 5 | 17 | 15 | |
| 6 | 25 | 21 | |
| 7 | 35 | 27 | |
| 8 | 47 | 31 | |
| 9 | 78 at 8.5 hrs. | 34 | |
| 10 | | 36 | |
| 11 | | 38 | |
| 12 | | 39 | |
| 13 | | 40 | |
| 14 | | 42 | |

Another test for determining the relative value of the material prepared in accordance with the present invention and that prepared according to the prior art is to place the material in a canister and pass a gas through the same. An experiment of this nature was carried out using a canister of the type employed in submarine gas masks. The test consisted in passing 1.1 mgs./l of carbon monoxide and approximately 22.8 mgs./l of water vapor through the canister at a rate of flow of 32 liters per minute.

As used in the canister, the caustic material acts as a drying agent, and in order to serve its purpose, it must absorb the water vapor at a rate sufficient to prevent poisoning of the hopcalite. The minimum time of penetration of a trace of carbon monoxide is 45 minutes. A large quantity of caustic pumice has been made in accordance with the present invention, which was sufficiently active that carbon monoxide did not penetrate before sixty minutes or longer. Caustic pumice prepared in accordance with the prior art when tested in the submarine canister, had a distinctively lower rate of water vapor absorption than material prepared in accordance with this invention.

A comparison has been made between material prepared in accordance with the present invention and that prepared according to the prior art by passing air saturated with water at 25° C. through a 10 centimeter depth of each material in a tube at a rate of flow of 500 centimeters per minute. The data in the table below shows the completeness with which the water vapor was absorbed:

| Time of passage of air saturated with water vapor (in hours) | Efficiency of our caustic pumice (%) | Efficiency of prior art caustic pumice (%) |
|---|---|---|
| 1 | 99.1 | 97 |
| 2 | 99.4 | 95.2 |
| 3 | 97.8 | 93.7 |
| 4 | 94.9 | |

It will be noted from the above results that our caustic pumice had a slightly higher efficiency, particular during the first two hours. It should also be noted that the resistance to flow of the prior art material was too high to measure on the apparatus in three and one-half hours, whereas our material had an increase in resistance not exceeding 10% in three hours.

From the foregoing comparative tests, it will be appreciated that the material prepared in accordance with the present invention is much more valuable and efficient than the absorbents heretofore prepared.

While I have described the preferred embodiment of my invention, I wish it to be understood that I do not confine myself to the precise steps or ingredients set forth herein by way of illustration, as it is apparent that many changes and variations may be made therein by those skilled in the art, without departing from the spirit of the invention or exceeding the scope of the appended claims.

I claim:

1. A process of making caustic kaolin for absorbing water and acid vapors, comprising introducing granular kaolin into a solution containing 4 or 5 parts of caustic alkali to 1 part of water at 100° C., allowing the temperature to rise to 140° C. during 10 to 20 minutes, draining the solution, baking the caustic kaolin above 300° C. to secure rapid and complete drying, and screening to size.

2. A process of making caustic pumice for absorbing water and acid vapors, comprising introducing granular pumice into an aqueous solution containing 40% to 90% alkali held between 80 to 160° C. with stirring for 10 to 30 minutes to combine the caustic with the pumice, draining the solution, baking the caustic pumice at an elevated temperature to secure complete drying, and screening to size.

3. A process of making caustic pumice for absorbing water and acid vapors, comprising introducing granular pumice into an aqueous solution containing 70 to 85% alkali at 135° C. holding the temperature between 130° and 140° C. for 10 to 20 minutes to combine the caustic with the pumice, draining the solution, baking the caustic pumice above 300° C. to secure complete drying, and screening to size.

4. A process of making a moisture and acid vapor absorbent comprising introducing silica-alumina containing material in the granular form into a hot aqueous solution of an alkali metal hydroxide, heating and agitating the mixture until substantial combination of the outer surface of the granular material with the alkali is effected, draining the alkali from the granular material, and drying the granular material by heating.

5. A process of making a moisture and acid vapor absorbent comprising the steps of introducing silica-alumina containing material in the granular form into a hot aqueous solution of a caustic alkali held at a temperature of from 80° to 230° C., the alkali solution being of a concentration of from two parts alkali and one part water to five parts alkali and one part water, stirring the mixture from five minutes to several hours, draining the alkali from the granular material, and drying the granular material by heating to temperatures above 230° C.

In testimony whereof I affix my signature.

PAUL O. ROCKWELL.